US008831221B2

(12) United States Patent
Bolotov et al.

(10) Patent No.: US 8,831,221 B2
(45) Date of Patent: Sep. 9, 2014

(54) UNIFIED ARCHITECTURE FOR CRYPTO FUNCTIONAL UNITS

(75) Inventors: Anatoli A. Bolotov, San Jose, CA (US); Mikhail I. Grinchuk, San Jose, CA (US); Lav Ivanovic, Sunnyvale, CA (US); Igor Kucherenko, Moscow (RU); Alexei Galatenko, Moscow (RU)

(73) Assignee: LSI Corporation, Milpitas, CA (US)

( * ) Notice: Subject to any disclaimer, the term of this patent is extended or adjusted under 35 U.S.C. 154(b) by 552 days.

(21) Appl. No.: 12/892,455

(22) Filed: Sep. 28, 2010

(65) Prior Publication Data

US 2012/0076298 A1    Mar. 29, 2012

(51) Int. Cl.
*H04L 9/00* (2006.01)
*H04L 9/06* (2006.01)

(52) U.S. Cl.
CPC ............ *H04L 9/0643* (2013.01); *H04L 9/0631* (2013.01); *H04L 2209/125* (2013.01)
USPC .............................................. 380/255; 380/30

(58) Field of Classification Search
CPC ........................ H04L 9/0631; H04L 2209/125
USPC ..................................... 380/255, 30; 713/150
See application file for complete search history.

(56) References Cited

U.S. PATENT DOCUMENTS

| 7,519,831 | B2 | 4/2009 | LeQuere |
| 2002/0191790 | A1* | 12/2002 | Anand et al. .................. 380/255 |
| 2004/0039928 | A1* | 2/2004 | Elbe et al. ...................... 713/189 |
| 2007/0258586 | A1* | 11/2007 | Huang et al. .................. 380/201 |
| 2009/0113212 | A1 | 4/2009 | Koehler et al. |
| 2009/0169013 | A1 | 7/2009 | Fascenda et al. |
| 2009/0327741 | A1 | 12/2009 | Zimmer et al. |

FOREIGN PATENT DOCUMENTS

| WO | WO 02/102026 | 12/2002 | |
| WO | WO 2010/098778 | * 9/2010 | ................ H04L 9/08 |

* cited by examiner

*Primary Examiner* — Matthew Smithers

(57) ABSTRACT

In described embodiments, a unified Crypto Functional Unit (CFU) block architecture provides a capability for advanced communication processors to provide parallel and concurrent processing of multiple crypto operations/transactions within high-speed hardware to support different security standards (e.g. from IPsec, 3GPP). In particular, each CFU block of the unified CFU block architecture comprises a FIFO-based interface, switch, and wrapped cipher/hasher. The unified CFU block architecture allows for drop-in solutions for cipher blocks in ASIC designs with crypto function blocks.

16 Claims, 4 Drawing Sheets

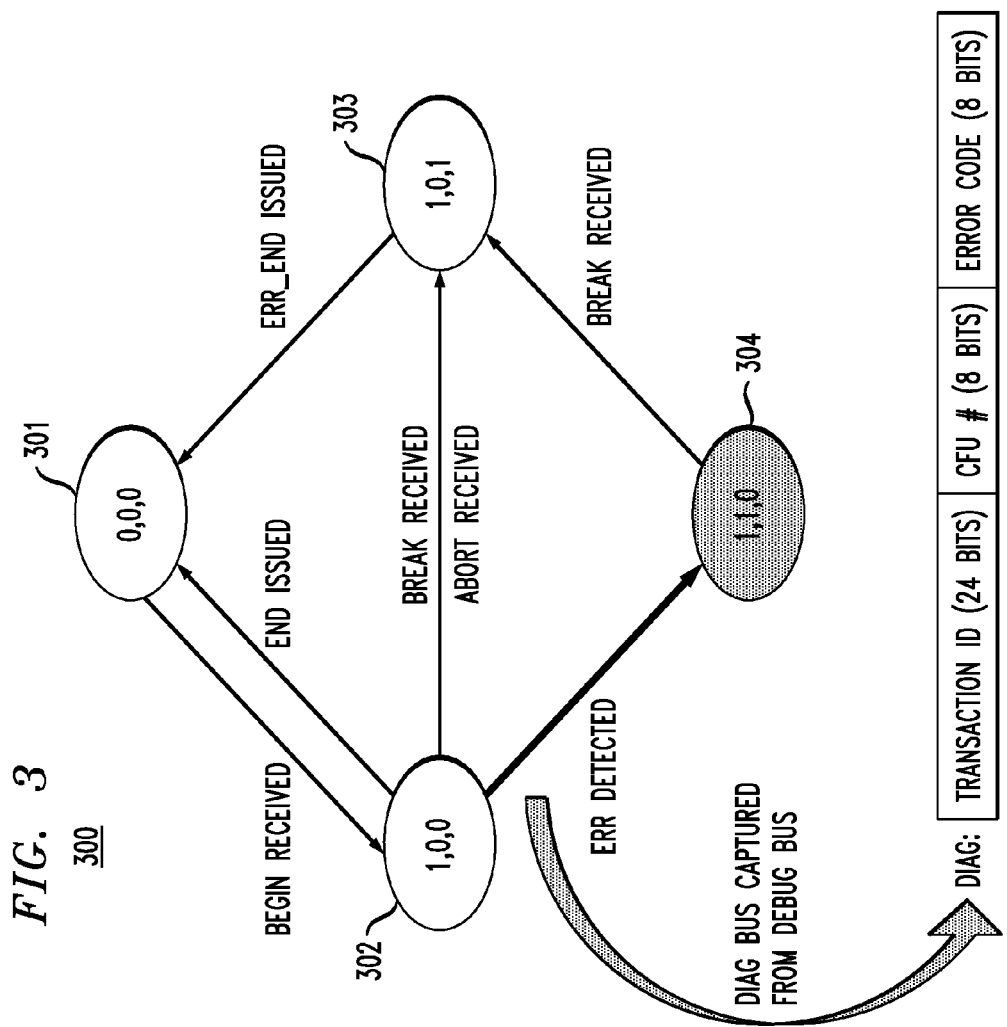

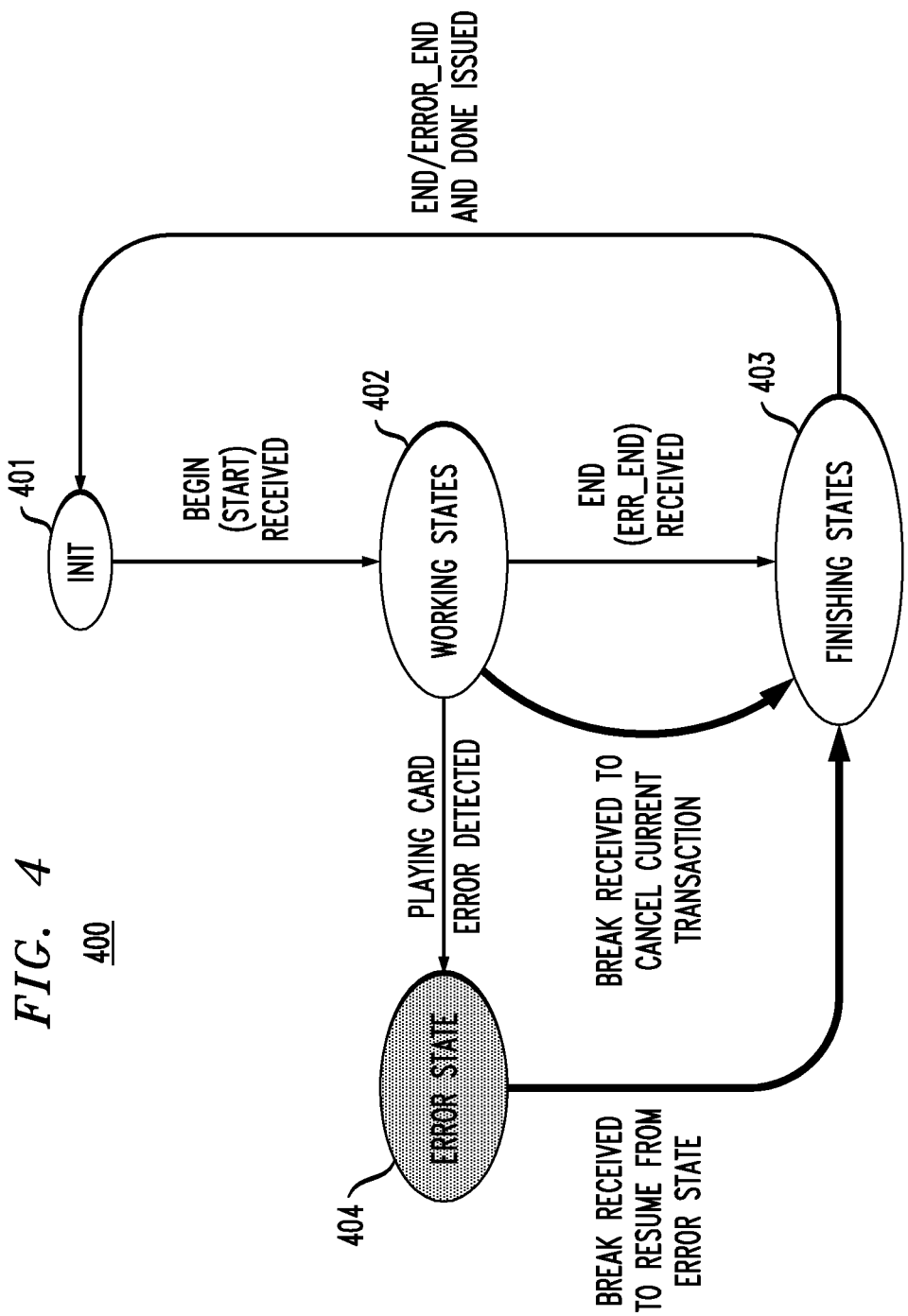

UNIFIED ARCHITECTURE FOR CRYPTO FUNCTIONAL UNITS

BACKGROUND OF THE INVENTION

1. Field of the Invention

The present invention relates to communication processors, and, in particular, to processing of multiple crypto functions.

2. Description of the Related Art

Cryptography (or "crypto") modules are increasingly incorporated into modern ASIC designs for various applications. These crypto modules generally support crypto functions specified in different standards (e.g. IPsec, 3GPP). Crypto modules find application for processing both cryptographic hash functions and computationally secure cryptographic functions.

A cryptographic hash function is a deterministic procedure that takes an arbitrary block of data and returns a fixed-size bit string, the (cryptographic) hash value, such that an accidental or intentional change to the data will change the hash value. Important applications of secure hashes include verification of message integrity and password verification. Determining whether any changes have been made, for example, can be accomplished by comparing hash values calculated before, and after, transmission (or any other event). Cryptographic hash functions have many information security applications, notably in digital signatures, message authentication codes (MACs), and other forms of authentication. They can also be used as ordinary hash functions, to index data in hash tables, to detect duplicate data or uniquely identify files, and as checksums to detect accidental data corruption. In information security applications, cryptographic hash values are sometimes called (digital) fingerprints, checksums, or just hash values, even though all these terms stand for functions with rather different properties and purposes. The SHA-1 and SHA-2 families of cryptographic hash function are commonly employed for these purposes.

Conventional computationally secure cryptography generally uses a shared secret key of limited length to provide message security, since these schemes are generally computationally infeasible to break (for limited computational resources) to determine the key for the encrypted message. Two common types of computationally secure cryptographic ciphers include block ciphers and stream ciphers. Block ciphers divide the data stream into discrete blocks (e.g., 64 or 128 bits), and apply the cipher on a block by block basis to provide encrypted message data (sometimes referred to as ciphertext blocks). The cipher key need not be of the same length as the block, and is reused over multiple blocks, requiring that this key be combined with the message in a complex or otherwise non-obvious manner. A popular class of block ciphers is Feistal ciphers, where encryption operations are grouped and repeated in rounds. The national Data Encryption Standard (DES) is based on Feistal ciphers with a 64-bit message block, 56-bit key and sixteen rounds. Other types of important block ciphers include IDEA used in (PGP) and RC5. The Advanced Encryption Standard (AES), a replacement for DES, employs 128-bit blocks with key sizes of 128, 192 or 256 bits. Modes of operation for block ciphers include Electronic Codebook (ECB), Counter Mode, Output Feedback Mode, and Cipher Block Chaining (CBC). AES, for example, includes such (e.g., NIST-approved) modes of operation as XEX-based Tweaked ECB mode with Cipher Text Stealing (XTS), Galois Counter mode (GCM), Counter mode with CBC-MAC(CCM) and the like.

KASUMI is a block cipher used in UMTS, GSM, and GPRS mobile communications systems, with the KASUMI algorithm specified in a 3GPP technical specification. KASUMI is a block cipher with 128-bit key and 64-bit input/output having an eight-round Feistel network. The round functions are irreversible Feistel network transformations, and, in each round, the round function uses a round key that comprises eight 16-bit sub keys derived from the original 128-bit key using a fixed key schedule. In UMTS, KASUMI is used in the confidentiality (f8) and integrity algorithms (f9), referred to as UEA1 and UIA1, respectively. In GSM, KASUMI is used in the A5/3 key stream generator and in GPRS in the GEA3 key stream generator.

Stream ciphers employ a one-time pad, usually generated with a seed, to generate a random or pseudo-random stream of bits that are logically combined with the data stream (e.g., a pseudo-random bit stream is generated from a seed and xor-ed with bits of the data stream). Often, the seed is changed on a message-by message basis to prevent detection of a particular seed. A commonly used stream cipher is RC4, which is a variable key-size cipher.

A commonly employed stream cipher is the SNOW family of ciphers (e.g., SNOW 1.0, SNOW 2.0, and SNOW 3G). SNOW ciphers are word-based synchronous stream ciphers, with SNOW 3G employed for the 3GPP encryption algorithms UEA2 and UIA2. The SNOW family of ciphers is characterized by a short initialization phase, works on 32-bit words, and supports both 128- and 256-bit keys. The cipher is a combination of a linear feedback shift register (LFSR) and a Finite State Machine (FSM), where the LFSR output also feeds the next state function of the FSM.

Crypto-function algorithms and protocols for security further include public key cryptography (such as digital signature generation and verification operations of, for example the Digital Signature Standard (DSS)). Other examples include elliptic curve cryptography (ECC) and RSA operations, and also Diffie-Hellman (DH) based protocols.

Several methods are employed to use a block cipher to build a cryptographic hash function, such as by use of a one-way compression function. The methods resemble the block cipher modes of operation usually used for encryption. Many well-known hash functions, including MD4, MD5, SHA-1 and SHA-2 are built from block-cipher-like components designed for the purpose, with feedback to ensure that the resulting function is not bijective. SHA-3 finalists include functions with block-cipher-like components (e.g., Skein, BLAKE) and functions based on other designs (e.g., Cube Hash, JH). A standard block cipher, such as AES can be used in place of these custom block ciphers when an embedded system needs to implement both encryption and hashing with minimal code size or hardware area.

Often, these crypto modules use different interfaces, and these crypto modules also require very specific and precise timing schedules for the input/output information. User's of these crypto modules generally prefer standardized interfaces, and/or integrated unified crypto blocks/crypto functional units (CFUs) instead of dozen of individual cipher blocks that are needed for implementation of various crypto algorithms/functions and protocols. Development of this complex structure requires also elaborating of the comprehensive debugging and testing system. Existing approaches lack parallelism and have poor support for drop-in security solutions. The existing approaches also require cumbersome testing and debugging during the development and implementation phases.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In embodiments of the present invention crypto-function data for one or more transactions is received into an input buffer from a host. A wrapped cipher/hasher module applies a crypto-function algorithm to the crypto-function data corresponding to each transaction based on a playing card template associated with each transaction. A switch coordinates transfer of the crypto-function data for each transaction between the input buffer and the wrapped cipher/hasher module based on control signals exchanged between the switch and the wrapped cipher/hasher module. The wrapped cipher/hasher module provides processed crypto data for each transaction based on the crypto-function data in accordance with the applied crypto-function algorithm.

BRIEF DESCRIPTION OF THE DRAWING

Other aspects, features, and advantages of the present invention will become more fully apparent from the following detailed description, the appended claims, and the accompanying drawings in which like reference numerals identify similar or identical elements.

FIG. 3 shows an exemplary state diagram for operation of the Wrapped Cipher/Hasher of FIG. 2; and FIG. 4 shows an exemplary state diagram for operation of the CFU block of FIG. 1

DETAILED DESCRIPTION

In accordance with exemplary embodiments of the present invention, a unified CFU block architecture provides a capability for advanced communication processors to provide parallel and concurrent processing of multiple crypto operations/transactions within high-speed in hardware (HW) to support different security standards (e.g. from IPsec, 3GPP). In particular, each CFU block of the unified CFU block architecture comprises a FIFO-based interface, switch and wrapper coupled to a cipher/hasher. The unified CFU block architecture allows for drop-in solutions for cipher blocks in ASIC designs with crypto function blocks. An integrated circuit (IC) or other application specific IC (ASIC) design might incorporate two or more CFU blocks in a virtual pipelined processing architecture to provide parallel and concurrent processing of multiple crypto operations/transactions. Such virtual pipelined processing architecture is described in, for example, U.S. patent application Ser. No. 12/782,379, filed May 18, 2010, the teachings of which are incorporated herein in their entirety by reference.

Figure 1:
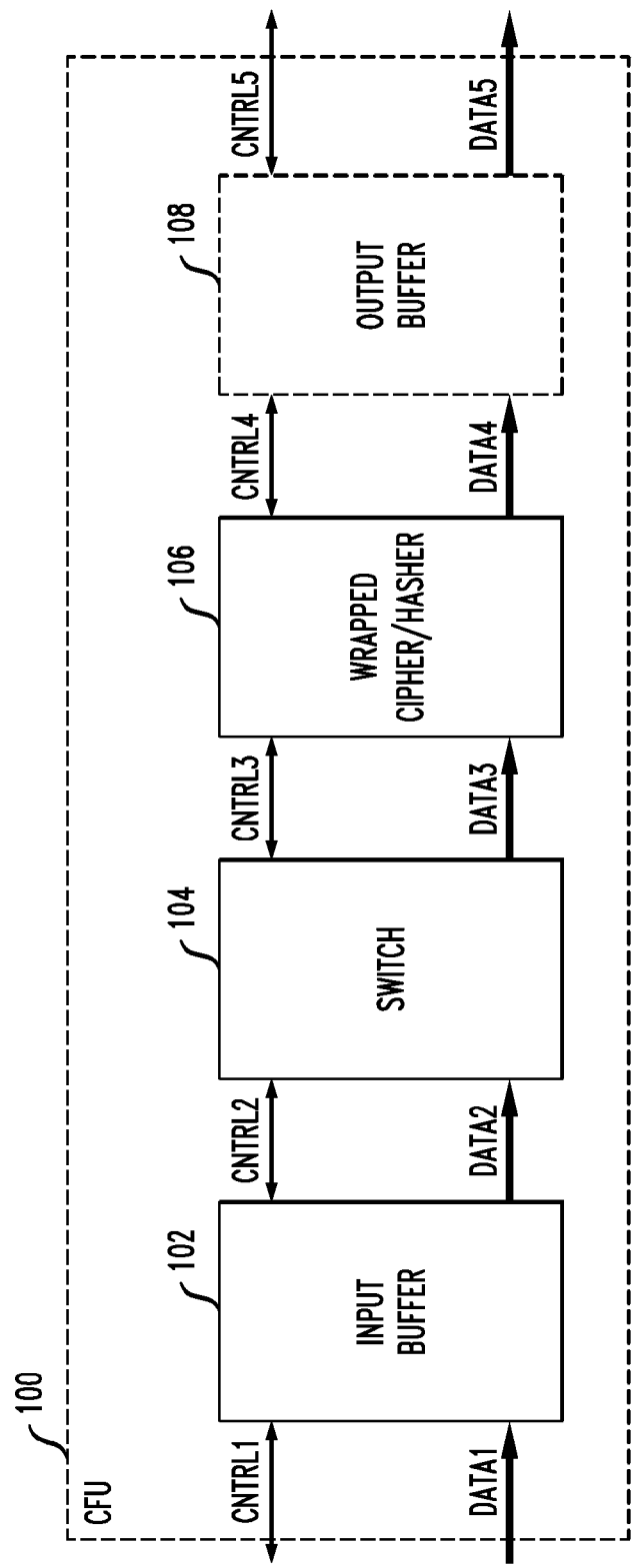
FIG. 1 shows an exemplary Crypto Functional Unit (CFU) block in accordance with an exemplary embodiment of the present invention.

FIG. 1 shows an exemplary Crypto Functional Unit (CFU) block 100 in accordance with an exemplary embodiment of the present invention. CFU block 100 comprises Input Buffer 102, Switch 104, Wrapped Cipher/Hasher 106, and optional Output Buffer 108. Input Buffer 102 receives crypto and other data DATA1 from an external device, such as a processor, coordinated through control messaging CNTRL1 between the external device and input buffer 102. Input buffer 102, in turn, provides selected data of DATA1 received at its input side as DATA2 to Switch 104. For described embodiments, Input Buffer 102 coordinates receipt of streams of crypto function information to be processed by a corresponding cipher/hasher core module-implemented algorithm (specified through use of a "Playing Card" template, described subsequently) of Wrapped Cipher/Hasher 106.

Input Buffer 102 might be implemented as a first-in, first-out (FIFO) buffer, might be fully synchronous so as to be memory free, and, for example, configurable from 2-16 locations. Input buffer 102 might be defined as given in the following module FIFO_FF:

module FIFO_FF (CLOCK, RESET, CO, DI, ENABLE_W, WE, FULL, W_ERR, DI_ERR, DO, ENABLE_R, NEXT, VALID, R_ERR).

Exemplary input signals for module FIFO_FF within CNTRL1 and DATA1 to Input Buffer 102 might be as defined in Table 1, and exemplary output signals for module FIFO_FF within CNTRL2, and DATA2 of input buffer 102 might be as defined in Table 2 (CNTRL1 and CNTRL2 might contain some of the signals in both Tables 1 and 2 depending on a given design requirements).

TABLE 1

| | | |
|---|---|---|
| CLOCK | System clock | |
| RESET | System reset (asynchronous) | Active Low |
| DI [71:0] | bus Input data to the buffer (Super Language formatted—command bus [7:0] and data bus [63:0]) | |
| ENABLE_W | Enable for writing input FIFO buffer port | Active High |
| WE | Write enable signal/request | Active High |
| ENABLE_R | Enable for reading input FIFO buffer port | Active High |
| NEXT | Read request for next available input FIFO buffer data | Active High |

TABLE 2

| | | |
|---|---|---|
| CO[3:0] | bus Counter for stored data in input FIFO buffer; MSB of internal counter is a waterlevel indicator of buffer occupancy | |
| FULL | Full buffer state—no further write attempts to internal buffer are accepted. | Active High |
| W_ERR | Write Error signal (attempt to write when buffer is full) | |
| R_ERR | Read Error signal (attempt to read data when buffer is empty/VALID is low) | Active High |
| DO[71:0] | bus Output data from the FIFO buffer (Super Language formatted—command bus [7:0] and data bus [63:0]) | |
| VALID | Indicates that buffer output data DO is available for reading | Active High |
| DI_ERR | bus Optional bus for debugging operations. Missed input data in the case of Write Error (when buffer is full writing input data DI is output/bypassed during the next clock along with W_ERR signal which is set high). | |

As employed herein, the names of signals are employed equivalently to name the corresponding signal conductor or bus (e.g., "CLOCK" is a signal that might be the system clock, but the term "CLOCK" as employed herein also corresponds to the signal conductor distributed throughout the system). The term "waterlevel" used herein refers to a value that serves as an indication of buffer occupancy.

Switch 104 serves to reconcile data and/or commands between the FIFO buffer of Input Buffer 102 and Wrapped Cipher/Hasher 106. Switch 104 i) transparently sends data and control signals between the FIFO buffer and Wrapped Cipher/Hasher 106; ii) generates a START signal (within CNTRL3 of FIG. 1) to signal to Wrapped Cipher/Hasher 106 that a new transaction is ready for processing; iii) filters out unrelated transactions or malformed data (optionally reporting errors); and responds to external CANCEL signal by instructing Wrapped Cipher/Hasher 106 to terminate processing of the associated transaction (and erasing data of the transaction in the FIFO buffer).

As employed herein, a "transaction" refers to a request to perform a crypto function on input data, with the crypto-function algorithm identified with the Playing Card. A transaction is defined with transaction delimiters BEGIN_TRANS and END_TRANS. Also, for the exemplary embodiment, the "active high" state corresponds to a logic "1" and "active low" state corresponds to a logic "0", although the present invention is not so limited to these values. The following exemplary module CSE_SIMPLIFIED_INPUT_SWITCH might implement functions of Switch 104:

```
module CSE_SIMPLIFIED_INPUT_SWITCH ( CLOCK ,
RESET , ENABLE , CFU_CONFIG , VALID_OUT , NEXT_IN ,
NEXT_OUT , START_ENABLED , START , CMD_IN , CMD_OUT ,
DATA_IN , DATA_OUT , DONE_WRITE , CANCEL , ERROR ,
DIAG_RQ , DIRECT_DIAG_RQ , DIAG , CFU_ID , EXCEPTION ,
SLOT_STATUS , GO , ABORT , STATUS_IN , STATUS ,
INTERNAL_DIAG ) ;
  input CLOCK ;
  input RESET , ENABLE ;
  input [15:0] CFU_CONFIG ;
  output VALID_OUT ;
  input NEXT_IN ;
  output NEXT_OUT ;
  input START_ENABLED ;
  output START ;
  input [7:0] CMD_IN ;
  output [7:0] CMD_OUT ;
  input [63:0] DATA_IN ;
  output [63:0] DATA_OUT ;
  input DONE_WRITE , CANCEL , ERROR , DIAG_RQ ,
  DIRECT_DIAG_RQ ;
  output [39:0] DIAG ;
  input [4:0] CFU_ID ;
  input EXCEPTION ;
  output [15:0] SLOT_STATUS ;
  input GO , ABORT ;
  input [3:0] STATUS_IN ;
  output [31:0] STATUS ;
```

CMD_IN and DATA_IN are a copied to CMD_OUT and DATA_OUT, respectively. Switch 104 has two internal states: i) state 0 (idle) indicating that processing is between transactions, and ii) state 1 (active) indicating that processing is inside a transaction. In state 0, Switch 104 receives (producing NEXT_OUT=1 and VALID_OUT=0) all information from the Input Buffer 102 (i.e., the FIFO buffer data BUFFER) until reaching BEGIN_TRANS with correct SCENARIO value bits (i.e. with SCENARIO==CFU_CONFIG, where CFU_CONFIG is an externally specified constant bus command). This behavior guarantees that any other information (non-related to the Playing Card-identified transaction that might be read by Switch 104) is ignored and data that might be read from input buffer 102 might be immediately discarded without transfer to Wrapped Cipher/Hasher 106 for processing.

If BEGIN_TRANS, and if START_ENABLED==1 and ERROR==0, Switch 104 jumps into state 1 and issues START=1 to begin processing the transaction. In state 1, Switch 104 copies NEXT_IN and VALID_IN signals unchanged into NEXT_OUT and VALID_OUT, respectively, until END_TRANS occurs. On END_TRANS, Switch 104 jumps back into state 0. On an active CANCEL signal, Switch 104 generates START=1 and VALID_OUT=0, jumps into state 0 and suppresses starting new transactions. On rough protocol violations, Switch 104 issues ERR=1 to indicate the presence of the error condition.

Figure 2:
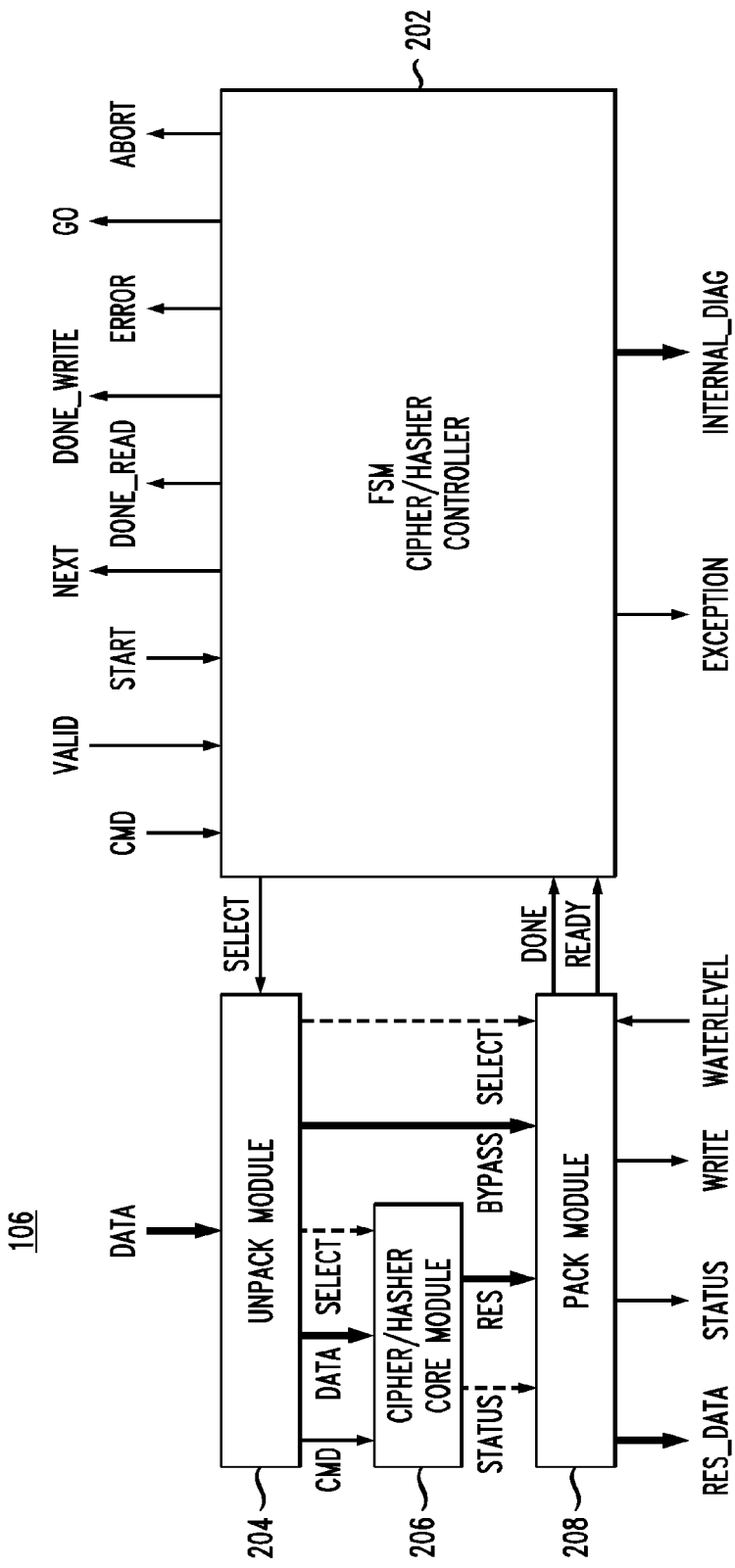
FIG. 2 shows an exemplary Wrapped Cipher/Hasher of FIG. 1.

FIG. 2 shows an exemplary Wrapped Cipher/Hasher 106 of FIG. 1. Wrapped Cipher/Hasher 106 comprises FSM (finite state machine) Cipher/Hasher Controller 202, Unpack module 204, Cipher/Hasher core module 206, and Pack module 208. In accordance with described embodiments herein, super language is employed to pass information between various modules. Super language describes the data flow (e.g., DATA) in terms of (e.g., 64-bit) blocks sent via the FIFO buffer without a timing schedule, and with unified markup via (e.g., 8-bit) control signals (e.g., CMD) containing op-codes and a relatively small set of flags (e.g., last={0,1} or size={1 . . . 8}).

Unpack module 204 translates and reformats crypto-function data from Super Language format crypto-function data (DATA) and commands (CMD) for an internal "generic" interface for Cipher/Hasher core module 206. Note that DATA and CMD might correspond to DATA_OUT and CMD_OUT of Switch 104. Pack module 208 translates and formats the processed crypto-function data (RES) to Super Language from the internal generic interface for Cipher/Hasher core module 206 (shown in FIG. 2 as output results RES_DATA, though RES_DATA might occupy the DATA bus when available). Processing by Cipher/Hasher core module 206 might be bypassed by Unpack module 204 by selection, if necessary, through the "bypass" channel of FIG. 2 and provided to Pack module 208. Pack module 208 also provides STATUS and WRITE commands to provide output processing status and data write enabling, respectively, from Wrapped Cipher/Hasher 106 to an external output buffer (e.g., optional Output Buffer 108).

Cipher/Hasher core module 206 is a processor configured to perform crypto processing through predefined algorithms on input (data and cmd) based on a specified Playing Card (embodied as information in (data and cmd) and other crypto function processing specific parameters. The Playing Card is passed to the Wrapped Cipher/Hasher 106 by the host or other external user device that employs the CFU block. Such crypto function processing might be in accordance with, and specified by, for example, various standards known in the art such as, but not limited to, AES, SHAs, TDES, KASUMI/SNOW f8/f9 and the like. FSM Cipher/Hasher Controller 202 coordinates the initialization and type of crypto function processing by Cipher/Hasher core module 206 through its select commands, monitoring the provision of output from Pack module 208 by the "done" (processing/packing finished) and "ready" (output data valid) flags.

FSM Cipher/Hasher Controller 202 supports a communicational protocol to work with Cipher/Hasher core module 206, which protocol might be a standardized protocol for preferred embodiments to allow reuse of the CFU block in a multi-CFU block architecture. FSM Cipher/Hasher Controller 202 receives a start signal START and begins processing the transaction written into the FIFO buffer of Input Buffer 102 (through Switch 104) according to the specified Playing Card and other crypto function processing specific parameters specified in BEGIN_TRANS field. Any mismatch with the Playing Card causes FSM Cipher/Hasher Controller 202 to go to the ERROR state, described subsequently with respect to FIG. 3.

Based on the output FIFO buffer waterlevel signal WATERLEVEL, Wrapped Cipher/Hasher 106 determines a critical level of empty space in an output FIFO buffer (either in optional output buffer 108 or external to CFU 100). Based on this determination, Wrapped Cipher/Hasher 106 suspends reading from input buffer 102 to prevent the output FIFO from over-flooding with the data already read from input buffer 102 and processed in Cipher/Hasher core module 206. If Cipher/Hasher core module 206 has a synchronous enabling/disabling signal, the enabling/disabling signal might be used to instant-stall current computation/processing of data inside Cipher/Hasher core module 206. Otherwise, FSM Cipher/Hasher Controller 202 stops reading and waits until enough room is available in the output FIFO.

The following exemplary module CSE_WRAPPED_generic_CIPHER might implement functions of Wrapped Cipher/Hasher 106. CSE_WRAPPED_generic_CIPHER is based on a particular Cipher/Hasher Core and its Playing Card, where definitions for signals/buses are given in Table 3 (for input values) and Table 4 (for output values):

```
module CSE_WRAPPED_generic_CIPHER (CLOCK,
RESET, ENABLE, DATA, CMD, VALID, START, WATERLEVEL,
RES, STATUS, INTERNAL_DIAG, WRITE, NEXT, ERROR,
DONE_READ, DONE_WRITE, GO, ABORT, EXCEPTION);
input CLOCK, RESET, ENABLE;
input [63:0] DATA;
input [7:0] CMD;
input VALID, START;
input [8:0] WATERLEVEL;
output [63:0] RES;
output [7:0] STATUS;
output [183:0] INTERNAL_DIAG;
output WRITE, NEXT, ERROR, DONE_READ, DONE_WRITE,
GO, ABORT, EXCEPTION;
```

TABLE 3

| | | |
|---|---|---|
| CLOCK | System clock | |
| RESET | System reset (asynchronous) | Active Low |
| ENABLE | Synchronous enable signal | Active High |
| VALID | Input FIFO value indicates DO valid for reading | Active High |
| START | Control signal from Switch: Start transaction processing | Active High |
| CMD [7:0] | bus Super Language formatted Command bus | |
| DATA [63:0] | bus Super Language formatted Data bus | |
| WATERLEVEL [8:0] | bus Output FIFO waterlevel, i.e. available free space (equals to 16-CO, where CO is counter's value for # of entries in FIFO buffer having capacity 16) | |

START signal is generated by Switch 104 Dispatching Unit for FSM Cipher/Hasher Controller 202 to start reading and processing transaction from the FIFO buffer of input buffer 102. FSM Cipher/Hasher Controller 202 is in its initial state INIT. RES_DATA and STATUS are formatted data written to output FIFO buffer (along with transaction delimiters BEGIN_TRANS and END_TRANS). CMD and DATA are formatted data read from Input FIFO (along with transaction delimiters BEGIN_TRANS and END_TRANS contained within CMD and DATA). ERR_END_TRANS is generated and written into output FIFO buffer along with DONE_READ signal generation. FSM Cipher/Hasher Controller 202 then causes Cipher/Hasher core 206 to initial state/condition (i.e., Cipher/Hasher core 206 can accept the transaction to come). FSM Cipher/Hasher Controller 202 then goes into its INIT state, along with DONE_WRITE signal generation.

FIG. 3 shows an exemplary state diagram 300 for operation of the CFU block of FIG. 1. A state of state diagram 300 is defined by values of GO, ERROR, and ABORT commands. For states 301, 302, and 304 of FIG. 3, when active high (e.g., "1"), the corresponding command GO, ERROR, and ABORT is set. States 301, 302, and 304 correspond to states having correct processing of the transaction (i.e., conditions are according to Playing Card and other crypto function scenario parameters.

When GO is set, processing is enabled in Cipher/Hasher core module 206 by FSM Cipher/Hasher Controller 202. Processing moves from State 301 to State 302 when GO is set (begin processing is issued from host). During processing, a BREAK or ABORT command might move the processing to State 303, described subsequently. Processing moves from State 302 to State 304 when ERROR is set when an error condition ERR is detected. For optional diagnostic testing, the DIAG diagnostic values from the DEBUG bus, a bus used for diagnostic operations, might be captured for testing and debugging purposes. DIAG might include the transaction ID, a CFU block number (in multiple-CFU block processing

TABLE 4

| | | |
|---|---|---|
| WRITE | Write request to output FIFO buffer | Active High |
| NEXT | Next data from input buffer for reading | Active High |
| RES [63:0] | bus Super Language formatted Result bus of cipher/hasher module crypto function processing operation | |
| STATUS [7:0] | bus Super Language formatted Status bus | |
| DONE_READ | Flag indicating that current transaction has been fully read from input FIFO (i.e. it is High when END_TRANS is being extracted from the FIFO) or canceled. This signal is generated by FSM Cipher/Hasher Controller and used by the Switch (Dispatching Unit). | Active High |
| DONE_WRITE | Flag indicating that current transaction has been fully processed by Cipher/Hasher module and sent to the output FIFO buffer (i.e. it is High when END_TRANS or ERR_END_TRANS is written into the FIFO). This signal also is generated by FSM Cipher/Hasher Controller and used by the Switch (Dispatching Unit). | Active High |
| ERROR | Flag indicating that FSM Cipher/Hasher Controller detected an error, i.e. the current transaction is not Playing Card compliant. FSM Cipher/Hasher Controller is going to error state and output Err_code along with other debug information via DEBUG bus. Err_code specifies what caused the error (e.g. an error in key loading section of transaction). Err_code description might be included within each Playing Card. | Active High |
| GO | GO signal displays FSM Cipher/Hasher Controller activity starting from Begin and until End Transaction processed. | Active High |
| ABORT | ABORT signal displays FSM Cipher/Hasher Controller activity during ending/recovery from error/break until ERR_END_TRANS processed. | Active High |
| INTERNAL_DIAG | bus Signals for debugging and testing. | |
| EXCEPTION | Disjunction of all assertion flags that might be computed as HW assertions inside the Wrapped Cipher/Hasher | Active High | systems), and an error code. An error condition ERR is detected and ERROR set when any mismatch with the Playing Card is found.

CFU control of Wrapped Cipher/Hasher 106 goes to the error state 304 and stays there until a break combination/signal command BREAK (by Switch 104 in response to a cancel command signal CANCEL sent by the host) is received, moving processing to state 303. An abort condition (and ABORT set) might arise when the host either i) sends a cancel command signal CANCEL (even if, so far, processing occurs without error) or ii) sets the aborting command in the current transaction. At state 303, CFU block 100 performs one or more functions to terminate processing of the transaction, or otherwise handle the error condition. CFU block 100 then issues an ERR_END to signal the end of error handling and to cause the process to return to state 301.

For CFU block 100 of FIG. 1 and state diagram of FIG. 3, four error conditions are processed: i) Input slots/output FIFOs read/write violations; ii) Rough formatted errors with transactions; iii) incorrect BEGIN_TRANS and END_TRANS; and iv) Stuck conditions of any nature.

For Input slots/output FIFOs read/write violations, a host device attempts to write to an input slot to a FIFO buffer when FULL output signal from that slot is set. Input data (e.g., DI) might be lost (e.g., writing request WE is ignored). During debugging/testing operations, CFU block 100 might discover this error and print out missed input data into a separate file. Reading violations might be excluded during debugging/testing operations. When optional Output Buffer 108 is not employed, no output FIFO is attached to CFU block 100, so an error of that type does not occur when a write request is issued from CFU block 100. CFU block 100 generally does not issue a write request (e.g., WE_O=1) in the case of a full output FIFO.

For Rough formatted errors with transactions, the host writes BEGIN_TRANS without valid Playing Card. A default action might be to terminate the transaction (i.e., read the transaction data/control but not transfer to Wrapped Cipher/Hasher 106) until an empty slot condition is detected or until a next BEGIN_TRANS command is detected, and then stop. Alternatively, the transaction might be transferred (if correct END_TRANS value) to an output slot ended with issue of ERR_END_TRANS. For receipt of a "garbage" input transaction, the host writes a value without valid BEGIN_TRANS. The garbage input transaction is automatically flushed out by Switch 104 until next BEGIN_TRANS is detected.

For incorrect BEGIN_TRANS and END_TRANS commands, the host writes/sends the transaction with syntax errors (e.g., any mismatch with Playing Card). Bugs/exceptions/errors generated within Wrapped Cipher/Hasher 106 computations are reported during debugging/testing operations and eliminated.

For Stuck conditions of any nature, a preferred method of recovery (e.g., no throughput degradation, no extra gate count, or the like) from stuck/stall CFU block operations is to cancel transaction with a CANCEL command. Also, setting of a corresponding defined field in BEGIN_TRANS might also be used for handling special stuck conditions (deadlocks, dead ends, and the like).

FIG. 4 shows an exemplary state diagram 400 for operation of cancellation/aborting (C/A) of CFU block 100 of FIG. 1 through CANCEL and BREAK commands (or flags). A host device might initialize parameters for CFU block 100 during initialization (Init) 401 in which counters and flags are initialized, along with passing of the Playing Card to CFU block 100 along with necessary data DI into the FIFO input buffer. A host device might then begin processing by CFU block 100 through issue of a START to transition to state Working states 402 in which processing of data DI from the input block begins according to the Playing Card. Working states 402 represents main processing of the transaction.

During processing of Working states 402, if CFU block 100 receives a CANCEL (Stop transaction) or BREAK (suspend transaction) command (e.g., to terminate processing of the present transaction or of future transactions by the host device), then the processing moves to Finishing states 403. Otherwise, when processing finishes (END) or if an end error (ERR_END_TRANS) occurs through normal processing of the crypto function by CFU block 100, then the processing moves from Working states 402 to Finishing states 403. Once processing completes at Finishing states 403 when processing finishes (END) or if an end error (ERR_END_TRANS) occurs, a DONE is issued and the process returns to Init 401. A BREAK or CANCEL might typically be ignored during Init 401 and Finishing states 403.

If, during processing, CFU block 100 detects an error in the Playing Card during Working states 402, the processing moves to Error state 404 to handle the error in the Playing Card (e.g., through query to host device, recovery routine, etc.). Error state 404 is state where a Playing Card mismatch is detected, indicating that the Playing Card mismatch is not supported within Working states 402 (note that software interfaces might be employed to perform pre-checking or more comprehensive checking of Playing Card values). Error handling, in turn, generates a CANCEL or BREAK, depending on the error handling process, which then transitions processing to Finishing State 403. Finishing states 403 represents processing to finish the transaction by CFU block 100 by indicating to the host device that the transaction is done (with or without error) and output data, if without error, is available.

Returning to FIG. 1, embodiments of the present invention might optionally include Output Buffer 108. Output Buffer 108 provides CFU block 100 an ability to control flow of data processed by CFU block 100 to external devices requesting the crypto functional processing identified with a corresponding Playing Card performed by Wrapped Cipher/Hasher 106. The following exemplary module FIFO might implement functions of Output Buffer 108:

module FIFO (CLOCK, RESET_O, WE_O, RE_O, DI_O, DO_O, CO_O, FULL_O, EMPTY_O, W_ERR_O, R_ERR_O, ERROR_O, DI_O_ERR).

Exemplary signals within CNTRL4, DATA4, CNTRL5, and DATA5 of output buffer 108 might be as defined subsequently. Output buffer 108 might be implemented as a FIFO buffer based on two copies of regular 1-port RAM memory RR8×72 type, configured for 16 locations. DI_O is data to be written to the FIFO buffer when write enable (WE_O) is set. Data DI_O and DO_O might, for example, be data provided from Wrapped Cipher/Hasher 106 (e.g., RES_DATA from pack module 208). Data DI_O/DO_O/DI_O_ERR width might be 72 bits (64+8) and CO_O is MSB of an internal counter (a waterlevel value equivalent to the entire counter (4-bit wide) value). FULL_O and EMPTY_O flags indicate full and empty conditions, respectively, of output buffer 108. RE_O signal allows external devices to read from the FIFO buffer through output data DO_O. Valid output data is available at next system clock (CLOCK) cycle (unless the FIFO buffer is not empty). W_ERR_O, when set, indicates that a write operation failed due to the FIFO buffer being in a full state (FULL). Missed data DI_O is then provided via DI_ERR_O port and not written into the FIFO buffer. R_ERR_O indicates that a read operation failed because of the FIFO buffer being in an empty state (EMPTY). ERROR signal indicates that an internal error occurred during the write/read operations.

The unified CFU block architecture in accordance with exemplary embodiments of the present invention, as described above, incorporates a Playing Card. The Playing Card is a form of template describing, in super language, how to operate a particular CFU block. Individual cipher/hasher modules might use a very complicated I/O interface and timing schedule. The Playing Card is passed between the user/host that controls microprogramming of the CFU block. Examples of super language AES and SHA-1 Playing Card templates are given in Template A and Template B, respectively, below.

---
Template A: AES
---

AES Playing Card
Structure:
** Input:
  1. BEGIN_TRANS
  2. (KEY SECTION)
  3. (IV SECTION - CTR & CBC modes only)
  4. (DATA SECTION)
  5. END_TRANS
** Output (for correct transactions):
  6. BEGIN_TRANS
  7. (RESULT SECTION)
  8. END_TRANS
** Output for incorrect transactions
  9. ERR_END_TRANS
Each Super Language line defines values of:
  on input side: Command Bus (cmd[7:0]) and Data Bus (data[63:0])
  on output side: Status Bus (status[7:0]) and Result Bus (res[63:0])
Bit ordering: bit 0 at the rightmost position
Padding: any value
=== INPUT SIDE ===
1. BEGIN_TRANS
cmd = 8'b00000001 // BEGIN_TRANS
data = { label[23:0], priority[7:0], prms[15:0], scenario[15:0] }
where:
  label: any value (transaction ID)
  priority: any value
  prms:
    prms[15:12]: Mode:
      0: ECB encryption
      1: ECB decryption
      2: CBC encryption
      3: CBC decryption
      4: CTR (also known as CM)
      6: AES-XCBC-MAC-96
      7: CMAC
      14: INVERT
    prms[11:8]: Arg:
      for Mode = ECB
        Arg is ignored
      for Mode = CBC
        Arg = 0 -> Do not use CTS (ciphertext stealing)
        Arg = 1 -> Use CTS only if the final block is incomplete
        Arg = 3 -> Use CTS even if the final block is complete
      for Mode = CTR
        Arg = 0 -> 32-bit counter
        Arg = 6 -> 64-bit counter
      for Mode = AES-XCBC-MAC-96
        Arg = 0 -> MAC_size = 96
        Arg = 1-8 -> MAC_size = 32 * Arg
      for Mode = CMAC
        Arg = 0 -> MAC_size = 128
        Arg = 1-8 -> MAC_size = 32 * Arg
      for Mode = INVERT
        Arg = 0 -> Invert key to obtain decryption key
        Arg = 1 -> Invert decryption key to recover original key
    prms[7:0]: ignored
  scenario: 0xcc6x
    or 000010xx000xxxxx
    or 00001xx1000xxxxx ---
Template A: AES
---

2. KEY SECTION
For N-byte key (N = 16, 24, 32, or 48)
line i = 1 to N/8
  cmd = 8'b000L0100                // L = (i == N/8)
  data = key[(N*8+63:N*8) - i*64]  // 8-bytes of key, starting at left
Note: N = 48 for AES-XCBC-MAC-96 or CMAC; N may be 16, 24 or 32
  for all other modes.
  The calculation is as follows:
    K0 = AES-ECB-128(K, 0). (Send data=0 to LL_AES in ECB mode.)
    f(B) = ((B & ~ (1<<127)) << 1) ^ (if (B >> 127) then 135 else 0)
    K1 = f(K0)
    K2 = f(K1)
3. IV SECTION
line i = 1 or 2:
  cmd = 8'b000L1000 // SEND_IV_0; L = (i == last)
  data = iv[(128+63:128) - i*64]// 8-bytes of IV, starting at left
4. DATA SECTION
For an M-byte packet (0 <= M <= 65536), final = (M+7)/8:
lines 1 to (final-1):
  cmd = 8'b00001100 // SEND_DATA_0, last=0, aux=0
  data = (64 bits) // 8-byte blocks of data starting at front of packet
final line:
  cmd = { aux[2:0], 5'b11100 } // SEND_DATA_0, last=1, aux=(M & 7)
  data = { last ((M+7)%8+1) bytes of packet, padding }
5. END_TRANS
cmd = 8'b00000010 // END_TRANS
data = { label[23:0], padding[39:0] }
where:
  label: the same value as in BEGIN_TRANS
=== OUTPUT SIDE (for correct transactions) ===
6. BEGIN_TRANS
status = 8'b00000001 // BEGIN_TRANS
data = { label[23:0], padding[39:0] }
where:
  label: transaction ID, copied from input's BEGIN_TRANS
7. RESULT SECTION
For an M-byte packet (0 <= M <= 65536), final = (M+7)/8:
lines 1 to (final-1):
  status = 8'b00001100 // RESULT_0, last=0, aux=0
  res = (64 bits) // 8-byte blocks of data starting at front of packet
final line:
  status = { aux[2:0], 5'b11100 } // RESULT_0, last=1, aux=(M & 7)
  res = { last ((M+7)%8+1) bytes of packet, padding }
8. END_TRANS
status = 8'b00000010 // END_TRANS
res = { label[23:0], padding[39:0] }
where:
  label: transaction ID, copied from input's BEGIN_TRANS
  padding : zero
=== OUTPUT SIDE (for incorrect transactions) ===
Note: Incorrect transactions start in the same way as correct ones, but their
lines may end at any moment (break inside a section without reaching line
with last=1 is also possible). The last output line of the incorrect
transaction is ERR_END_TRANS instead of
END_TRANS, where:
9. ERR_END_TRANS
status = 8'b10000010 // ERR_END_TRANS
if error was reported upstream of the cipher:
  res = { label[23:0], report[39:0] }
if error was first detected by the cipher:
  res = { label[23:0], padding[39:0] }
where:
  label: transaction ID, copied from input's BEGIN_TRANS
  report: the upstream error report
  padding : zero ---
Template B: SHA-1
---

SHA-1 Playing Card
Structure:
** Input:
  1. BEGIN_TRANS
  2. DATA SECTION

Template B: SHA-1

```
3. END_TRANS
** Output (for correct transactions):
    4. BEGIN_TRANS
    5. (RESULT SECTION)
    6. END_TRANS
** Output for incorrect transactions
    7. ERR_END_TRANS
Each SuperLanguage line defines values of:
    on input side: Command Bus (cmd[7:0]) and Data Bus (data[63:0])
    on output side: Status Bus (status[7:0]) and Result Bus (res[63:0])
=== INPUT SIDE ===
1. BEGIN_TRANS
cmd = 8'b00000001 // BEGIN_TRANS
data = { label[23:0], priority[7:0], prms[15:0], scenario[15:0] }
where:
    label: any value (transaction ID)
    priority: any value
    prms: job id - a predefined constant that indicates
        that plain sha-1 should be calculated,
        currently 3 (16'b0000000000000011)
    scenario: a pre-defined constant.
2. DATA SECTION
Note: (bit ordering: data is sent "as is", e.g. "abc..." generates data
    0x616263.= b0110000101100010011000011...)
lines 1 to (last−1):
    cmd = 8'b00001100 // SEND_DATA_0, last=0, aux=0
    data = (64 bits)
last line (64-bit case):
    cmd = 8'b00011100 // SEND_DATA_0, last=1, aux=0
    data = (64 bits)
last line (8 to 56 bits - 1 to 7 bytes - cases):
    cmd = { len[2:0], 5'b11100 } // SEND_DATA_0, last=1, aux=len
    data = (8*len (in bytes)) arbitrary padded to 64 bits width // len=1...7
3. END_TRANS
cmd = 8'b00000010 // END_TRANS
data = { label[23:0], padding[39:0] }
where:
    label: the same value as in BEGIN_TRANS
    padding: any value
=== OUTPUT SIDE (for correct transactions) ===
4. BEGIN_TRANS
status = 8'b00000001 // BEGIN_TRANS
data = { label[23:0], padding[39:0] }
where:
    label: transaction ID, copied from input's BEGIN_TRANS
    padding: zero bits
5. RESULT SECTION
lines 1 and 2:
    status = 8'b00001100 // RESULT_0, last=0, aux=0
    res = (64 bits) // H0||H1 for the first line; // H2||H3 for the second line
last line:
    status = 8'b10011100 // RESULT_0, last=1, aux=4
    res = (32 bits) padded by zeros to the 64 bit
        width    // H5||0x00000000
6. END_TRANS
status = 8'b00000010 // END_TRANS
res = { label[23:0], padding[39:0] }
where:
    label: transaction ID, copied from input's BEGIN_TRANS
    padding: currently - zero bits
=== OUTPUT SIDE (for incorrect transactions) ===
Note: Incorrect transaction starts in the same way as correct one, but
its lines may end at any moment (break inside a section without
reaching line with last=1 is also possible). The last output line of the
incorrect transaction is ERR_END_TRANS instead of END_TRANS,
where:
7. ERR_END_TRANS
status = 8'b10000010 // ERR_END_TRANS
res = { label[23:0], padding[39:0] }
where:
    label: transaction ID, copied from input's BEGIN_TRANS
    padding: zero bits
```

A unified CFU block architecture in accordance with exemplary embodiments of the present invention provides for the following advantages. The unified CFU block architecture allows integration into different security hardware designs without complicated wrappers and comprehensive testing/debugging, providing unified building blocks for various security applications. The unified CFU block architecture also allows for a high level of reuse of CFU block designs, and also of other tools that support unified CFU development flow. Main features of the unified CFU block architecture are a FIFO-based I/O that eliminates detailed time scheduling for transactions; a unified interface (e.g., 8-bit Control+64-bit Data) for all ciphers/hashers; specialized binary and mnemonic languages for command/data description; Playing Card-based scenarios/job description; unified testing/debugging support; and unified error handling and reporting. Novel transaction arbitration/dispatching allows for flexible handling of multiple streams, and relatively fast input/output channels for concurrent crypto transaction processing in hardware. Based on this, standard crypto blocks/algorithms, such as AES, SHAs, TDES, KASUMI/SNOW f8/f9 and the like, might be combined together to provide a wide range of crypto service functions in a single solution.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A crypto function unit (CFU), the CFU comprising:
an input buffer configured to receive crypto-function data for one or more transactions from a host;
a wrapped cipher/hasher module configured to apply a crypto-function algorithm to the crypto-function data corresponding to each transaction based on a playing card template associated with each transaction; and
a switch configured to transfer of the crypto-function data for each transaction between the input buffer and the wrapped cipher/hasher module based on control signals exchanged between the switch and the wrapped cipher/hasher module,
wherein the wrapped cipher/hasher module provides processed crypto data for each transaction based on the crypto-function data in accordance with the applied crypto-function algorithm,
wherein the wrapped cipher/hasher module comprises:
a cipher/hasher core module configured to apply the crypto-function algorithm to the crypto-function data for a transaction based on the playing card template associated with the transaction, and the cipher/hasher core module is configured to be bypassed by the unpack module by a selection through a bypass channel to the pack module,
an unpack module configured to translate/reformat the crypto-function data between a first format of the crypto-function data to a second format of the cipher/hasher core module;
a pack module configured to translate/reformat the processed crypto data of the second format of the cipher/hasher core module to the first format; and
a cipher/hasher core module configured to apply the crypto-function algorithm to the crypto-function data for a transaction based on the playing card template associated with the transaction, wherein the cipher/hasher core module is configured to be bypassed by the unpack module by a selection through a bypass channel to the pack module, wherein the cipher/hasher module comprises:
a finite state machine (FSM) cipher/hasher controller, coupled to the cipher/hasher core module, configured to initialize the cipher/hasher core module for the crypto-function algorithm associated with the playing card identifier, wherein the FSM cipher/hasher controller is configured to (i) verify the playing card template associated with the transaction and, if the playing card template is valid, (ii) begin processing of the crypto-function data for the transaction by the cipher/hasher core module.

2. The CFU of claim 1, wherein, if the playing card template is not valid, the FSM cipher/hasher controller is further configured to terminate processing of the crypto-function data for the transaction by the cipher/hasher core module.

3. The CFU of claim 1, wherein the first format is a Super Language format.

4. The CFU of claim 1, wherein signals generated from the unpack/pack module are sent to the FSM cipher/hasher controller to indicate the end of processing of the transaction by the cipher/hasher core module.

5. The CFU of claim 1, wherein the unpack/pack module is further configured to provide signaling to an output buffer to read the processed crypto data based on a water level signal from the output buffer.

6. The CFU of claim 1, wherein the crypto-function algorithm is one or more of AES, MD4, MD5, SHA-1, SHA-2, SHA-2, Triple-DES, KASUMI/SNOW, confidentiality algorithm (f8) or integrity algorithm (f9).

7. The CFU of claim 1, wherein the CFU is one of a plurality of CFUs embodied in an application specific integrated circuit (ASIC).

8. The CFU of claim 7, wherein the plurality of CFUs are coupled in a parallel processing architecture with virtual pipelining of a network processor.

9. A method of processing crypto-function data by a crypto function unit (CFU), the method comprising the steps of:
receiving crypto-function data for one or more transactions from a host;
applying, by a wrapped cipher/hasher module, a crypto-function algorithm to the crypto-function data corresponding to each transaction based on a playing card template associated with each transaction;
coordinating, with a switch, transfer of the crypto-function data for each transaction between the input buffer and the wrapped cipher/hasher module based on control signals exchanged between the switch and the wrapped cipher/hasher module; and
providing, by the wrapped cipher/hasher module, processed crypto data for each transaction based on the crypto-function data in accordance with the applied crypto-function algorithm,
wherein the step of the applying a crypto-function algorithm comprises the steps of translating/reformatting, by an unpack module of the wrapped cipher/hasher module,
the crypto-function data between a first format of the cipher/hasher core module to a second format of the cipher/hasher core module;
translating/reformatting, by a pack module of the wrapped cipher/hasher module, the processed crypto data of the second format of the cipher/hasher core module to the first format;
initializing, by a finite state machine (FSM) cipher/hasher controller coupled to the cipher/hasher core module, the cipher/hasher core module for the crypto-function algorithm associated with the playing card identifier;
verifying the playing card template associated with the transaction; and, if the playing card template is valid:
applying, by a cipher/hasher core module of the wrapped cipher/hasher module, the crypto-function algorithm to the crypto-function data for a transaction based on the playing card template associated with the transaction, wherein the cipher/hasher core module is bypassed by the unpack module by a selection through a bypass channel to the pack module; and
supporting, by a finite state machine (FSM) cipher/hasher controller, a communication protocol to work with the cipher/hasher core module.

10. The method of claim 9, wherein, if the playing card template is not valid:
terminating the processing, by the FSM cipher/hasher controller, of the crypto-function data for the transaction by the cipher/hasher core module; and
bypassing, by the bypass channel, the cipher/hasher core module.

11. The method of claim 9, further comprising translating/reformatting the crypto-function data between i) a first format of the crypto-function data to a second format of the cipher/hasher core module and ii) translating/reformatting the processed crypto data of the second format of the cipher/hasher core module to the first format.

12. The method of claim 11, wherein the first format is a Super Language format.

13. The method of claim 11, further comprising providing signaling to the FSM cipher/hasher controller to indicate the end of processing of the transaction by the cipher/hasher core module.

14. The method of claim 11, further comprising providing signaling to an output buffer and reading the processed crypto data based on a water level signal from the output buffer.

15. The method of claim 9, wherein the crypto-function algorithm applied is one or more of AES, MD4, MD5, SHA-1, SHA-2, SHA-3, Triple-DES, KASUMI, and SNOW crypto-function algorithms.

16. A non-transitory machine-readable storage medium, having encoded thereon program code, wherein, when the program code is executed by a machine, the machine implements a method for processing crypto-function data by a crypto function unit (CFU), the method comprising the steps of:
receiving crypto-function data for one or more transactions from a host;
applying, by a wrapped cipher/hasher module, a crypto-function algorithm to the crypto-function data corresponding to each transaction based on a playing card template associated with each transaction;
coordinating, with a switch, transfer of the crypto-function data for each transaction between the input buffer and the wrapped cipher/hasher module based on control signals exchanged between the switch and the wrapped cipher/hasher module; and
providing, by the wrapped cipher/hasher module, processed crypto data for each transaction based on the crypto-function data in accordance with the applied crypto-function algorithm,
wherein the step of the applying a crypto-function algorithm comprises the steps of translating/reformatting, by an unpack module of the wrapped cipher/hasher module, the crypto-function data between a first format of the cipher/hasher core module to a second format of the cipher/hasher core module;
translating/reformatting, by a pack module of the wrapped cipher/hasher module, the processed crypto data of the second format of the cipher/hasher core module to the first format;
initializing, by a finite state machine (FSM) cipher/hasher controller coupled to the cipher/hasher core module, the cipher/hasher core module for the crypto-function algorithm associated with the playing card identifier;
verifying the playing card template associated with the transaction; and, if the playing card template is valid:
applying, by a cipher/hasher core module of the wrapped cipher/hasher module, the crypto-function algorithm to the crypto-function data for a transaction based on the playing card template associated with the transaction, wherein the cipher/hasher core module is bypassed by the unpack module by a selection through a bypass channel to the pack module; and
supporting, by a finite state machine (FSM) cipher/hasher controller, a communication protocol to work with the cipher/hasher core module.

* * * * *